United States Patent
Rollag

(10) Patent No.: US 9,454,543 B1
(45) Date of Patent: Sep. 27, 2016

(54) SYSTEMS AND METHODS FOR DATABASE RECORDS MANAGEMENT

(76) Inventor: Jason Bryan Rollag, London (GB)

(*) Notice: Subject to any disclaimer, the term of this patent is extended or adjusted under 35 U.S.C. 154(b) by 18 days.

(21) Appl. No.: 13/465,177

(22) Filed: May 7, 2012

Related U.S. Application Data

(60) Provisional application No. 61/482,697, filed on May 5, 2011.

(51) Int. Cl.
*G06F 7/00* (2006.01)
*G06F 17/30* (2006.01)

(52) U.S. Cl.
CPC .............................. *G06F 17/30215* (2013.01)

(58) Field of Classification Search
CPC ..................... G06F 17/3056; G06F 17/30575; G06F 13/385; G06F 17/30215; G06F 2221/2141; G06F 9/468
USPC ....... 707/609, 612, 614, 615, 623, 624, 629, 707/640, 705, 758, 783, 999.009
See application file for complete search history.

(56) References Cited

U.S. PATENT DOCUMENTS

| | | | |
|---|---|---|---|
| 6,898,609 B2* | 5/2005 | Kerwin | 707/634 |
| 7,149,742 B1* | 12/2006 | Eastham et al. | |
| 7,403,946 B1* | 7/2008 | Taylor | 707/612 |
| 2002/0178140 A1* | 11/2002 | Woodmansee et al. | 707/1 |
| 2007/0100827 A1* | 5/2007 | Lu et al. | 707/8 |
| 2008/0168461 A1* | 7/2008 | Arndt et al. | 718/104 |
| 2011/0040792 A1* | 2/2011 | Perry | G06F 17/30215 707/783 |
| 2012/0131589 A1* | 5/2012 | Golab et al. | 718/104 |
| 2012/0158653 A1* | 6/2012 | Shaffer et al. | 707/622 |

* cited by examiner

*Primary Examiner* — M D. I Uddin
(74) *Attorney, Agent, or Firm* — Cowan, Liebowitz & Latman, P.C.; Steven D. Underwood

(57) ABSTRACT

One exemplary aspect comprises a method comprising: (a) storing, in a first database, data specific to a client; (b) based on the data, identifying with a processing system comprising one or more processors one or more fields of a record to be updated in a second database managed by the client; (c) obtaining write-only access to one or more fields of the identified one or more fields of the record; and (d) updating, based on the data stored in the first database, one or more fields of the identified one or more fields of the record in the second database.

18 Claims, 3 Drawing Sheets

SYSTEMS AND METHODS FOR DATABASE RECORDS MANAGEMENT

CROSS-REFERENCE TO RELATED APPLICATIONS

This patent application claims priority to U.S. provisional application No. 61/482,697, entitled "Systems and Methods for Database Records Management," filed May 5, 2011. The entire contents of that application are incorporated herein by reference.

INTRODUCTION

Exemplary embodiments relate generally to the field of Database and Client Relationship Management (CRM) Software. For the purpose of this classification, CRM and database are generally used interchangeably herein, and may refer to any general data storage facility that is used in a sales environment.

Database management and keeping records current is a recurring problem due to the dynamic nature of information. This is a particular challenge in closed CRM software and database architecture because this data, and commercial sales processes, are confidential in nature.

In an exemplary embodiment, the process of adding relevant records and updating information within existing records may be sourced by an external data service provider (Host). The Host is able to have one-way access to the Client CRM via an Apparatus. In this embodiment, the Apparatus may be installed via a plug-in. However, other versions may be more dynamic in nature—for example, the use of key word updating where the process of updating a record may be based on identifying a name in a field or a combination of fields.

In an exemplary embodiment, a data service provider (the Host) furnishes up-to-date potential information to its Clients by sharing its database and furnishing regular updates in a way that does not obstruct a Client database. This sharing may be done via a one-way data transfer from the Host database to the Client CRM via the Apparatus. The Apparatus may insert any new information that is pertinent to the Client (via a filter) and then may update certain fields that are designated to be relevant. Fields that are considered Client specific or crucial to the Client may be left untouched. The process and apparatus preferably is not designed to view any Client specific records or Client designated fields within those records.

This embodiment effectively updates, for example, important sales information without giving the Host access to the Client information. Other examples include adding new potential customer records identified by the Host, updating new emails, telephone numbers, changes in customer human resources, and sharing information that may be relevant to the Client.

The Host may have a database of records relevant to the Client and selectively filter these records to match the Client profile via a control panel. The information within the fields of these records may be refreshed once new information is received via voice, email, or Internet.

The Host CRM and the Client CRM may be linked via a holding CRM where data is stored and downloaded either automatically or upon Client request. The delivery of the data may be made possible via the Apparatus installed on the Client CRM. The Holding CRM is also where the permissions may be held regarding what data the Client has access to and for how long this access is allowed.

The data that is provided (downloaded or updated) from the Host may be used to supplement the Client's existing database and overwrite out of date ID specific (Host) data with more current information. ID specific in this case refers to data that is added and/or amended by the Host.

In this exemplary embodiment, the Client may have other records that are the same or similar. The Apparatus preferably does not add or subtract to these records and it is up to the Client to determine whether or not they will be combined (Client record added to the Host record) or suppressed (Host record hidden, or in some cases deleted). An exemplary embodiment comprises an implementation based on matching a specific field within a record and subsequently employing the Method of the Apparatus for other fields within that record.

The data that is supplied by the Host becomes "owned" by the customer. Should the customer decide to unsubscribe, then the Method may be stopped by the Host (and/or the apparatus is uninstalled by the Client).

Any changes made by the Host may be noted in the notes section for the Client to see. The Client, at this point, may be able to reconcile its own data with the Host's data with the notes section any additional information, so that the database is tailored and used by the Client.

The Apparatus contributes to the maintenance of the Client's database in a non-invasive way. This allows the Client to market more effectively to the core audience.

One exemplary aspect comprises a method comprising: (a) storing, in a first database, data specific to a client; (b) based on the data, identifying with a processing system comprising one or more processors one or more fields of a record to be updated in a second database managed by the client; (c) obtaining write-only access to one or more fields of the identified one or more fields of the record; and (d) updating, based on the data stored in the first database, one or more fields of the identified one or more fields of the record in the second database.

Another exemplary aspect comprises a system comprising: (a) a first database storing data specific to a client; (b) a processor in communication with the first database that, based on the data, identifies one or more fields of a record to be updated in a second database managed by the client; (c) a processor in communication with the second database that obtains write-only access to one or more fields of the identified one or more fields of the record; and (d) a processor in communication with the second database that updates, based on the data stored in the first database, one or more fields of the identified one or more fields of the record in the second database.

In one or more exemplary embodiments: (1) a database management system managing the first database is not given read access to records in the second database; (2) the identifying comprises identifying a name in a field or a combination of fields; (3) the write-only access to the second database is obtained via a plug-in to software managing the second database; (4) the method further comprises adding one or more new records to the second database; (5) the obtaining step is performed via a filter; (6) the updating is performed in response to a request from the client; (7) the updating is performed according to a schedule; and (8) the updating is performed in response to changes in the data stored in the first database.

Another exemplary aspect comprises an apparatus comprising a non-transitory computer readable medium storing software operable to perform the steps of claim 1.

Additional aspects and embodiments will be apparent from the drawings and the description below.

DETAILED DESCRIPTION OF SELECT EXEMPLARY EMBODIMENTS

Figure 1:
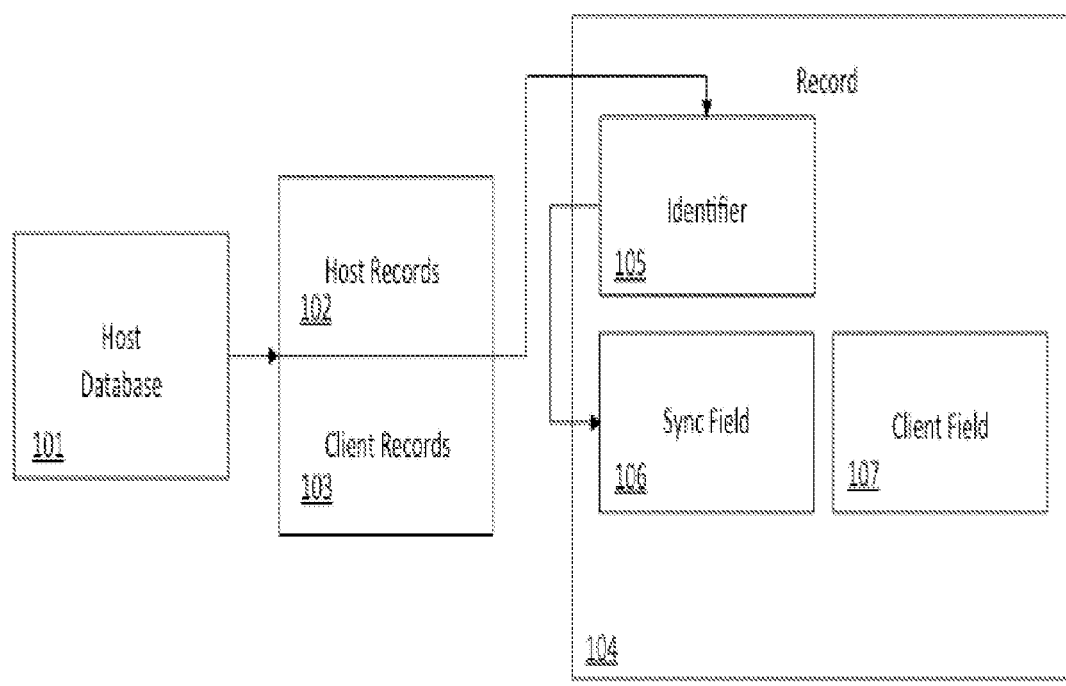
FIG. 1 depicts a block diagram of an exemplary synchronization process.

FIG. 1 depicts how the records may be updated, and an exemplary process hierarchy. Each record may have a unique identifier 105. When a Client decides to use the Apparatus or it is implemented automatically, a search function may go through each record and find what has changed using the Host's Database 101 as an ultimate reference. When a change is found, the Apparatus may copy the deleted information and post it to the notes section with a time stamp. If a record is missing or new to the Client CRM, then the program may create it 104. The customer may make a record "invisible" if it is not interesting or out of scope. The Client is able to edit the identifier if the Client wishes to maintain the record itself. The Host does not have access to the Client's records and the Apparatus preferably is secure from unauthorized users. The instructions may comprise object code generated from any compiled computer-programming language, including, for example, C, C+, C++, Visual Basic, Linux, Apache, Mysql, Php or PHP.

Exemplary Method Steps

In an exemplary embodiment, the program checks a unique identifier 105 relative to the Host record on field 102 located in the Host Database 101. If 102 does not equal to 104, 102 is inserted into the Client CRM with unique identifier 105. If the identifier 105 matches the Client record 104 to Host record 102, the apparatus may then scan the Sync fields 106. If the sync fields have different information, then the updated information from the Host record may overwrite the information in the Client record. Any changes made by the Host may be posted in a notes section. The Apparatus may perform this method across all fields within a Client record 104.

It is important to recognize that in this exemplary embodiment the unique identifier is what controls whether the method is carried out on the field. If the unique identifier doesn't match, then the Apparatus does not perform the Method on that particular part of the record. If it does, the fields within the record will match with the previous method performed by the Apparatus. If the Host updates the fields, then the changes are based on the Host CRM. If the Client changes the fields, then the record changes back into what the Host recorded. Further iterations may include a pop up window that alerts the Client that the record will be changed back. If the Client doesn't want the Host to sync the record, then the Client can change the ID and the Host will insert an ID (depending on the version).

Exemplary Implementation

Figure 2:
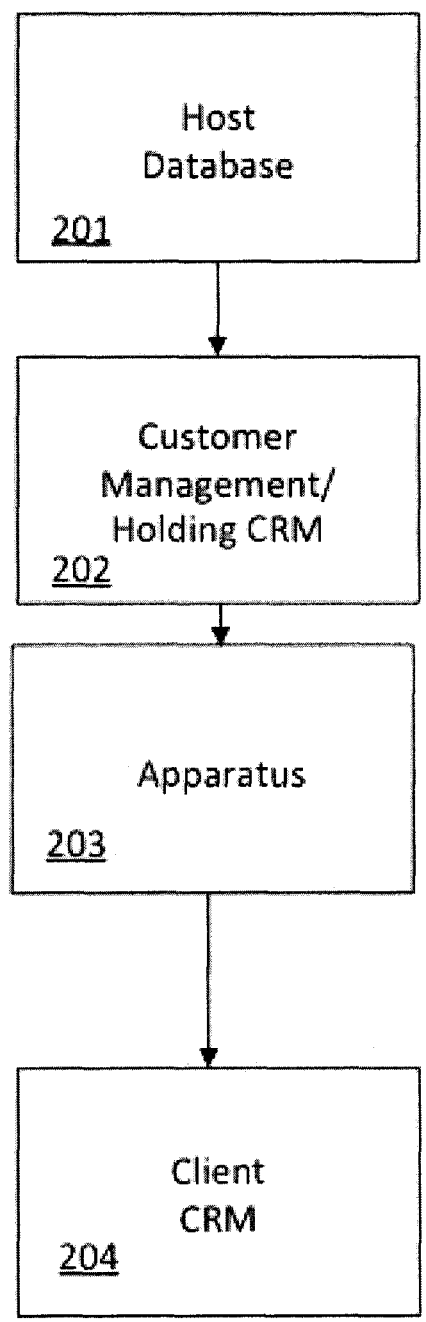
FIG. 2 depicts an exemplary Host Apparatus tool and an exemplary process hierarchy.

FIG. 2 is an exemplary depiction of how the synch system works in practice from a system software perspective. Raw data (for example: name, contact details, current and past employment details) may be collected through external sources in various formats like .Excel, .CSV, .doc, .txt, or inserted manually into the CRM system through import functionality or manually, into the Host Database 201. The Host Database 201 in this embodiment is the Master CRM or database where records are constantly updated.

Records that are updated in the Host Database then pass through to the Customer Management/Holding CRM 202. In this embodiment, the Holding CRM is effectively a holding pen where the records are kept until the Client decides to update manually or the system times in automatic updates. The Apparatus 203 may be installed as a plug in on the compatible Client CRM. This plug in allows the Host CRM access to add or change the records that are added to the Client's secure CRM. The Host assigns permissions to the Client via the Customer Management/Holding CRM 202—for example, which parts of the database that should be accessible to the Client and for how long.

Figure 3:
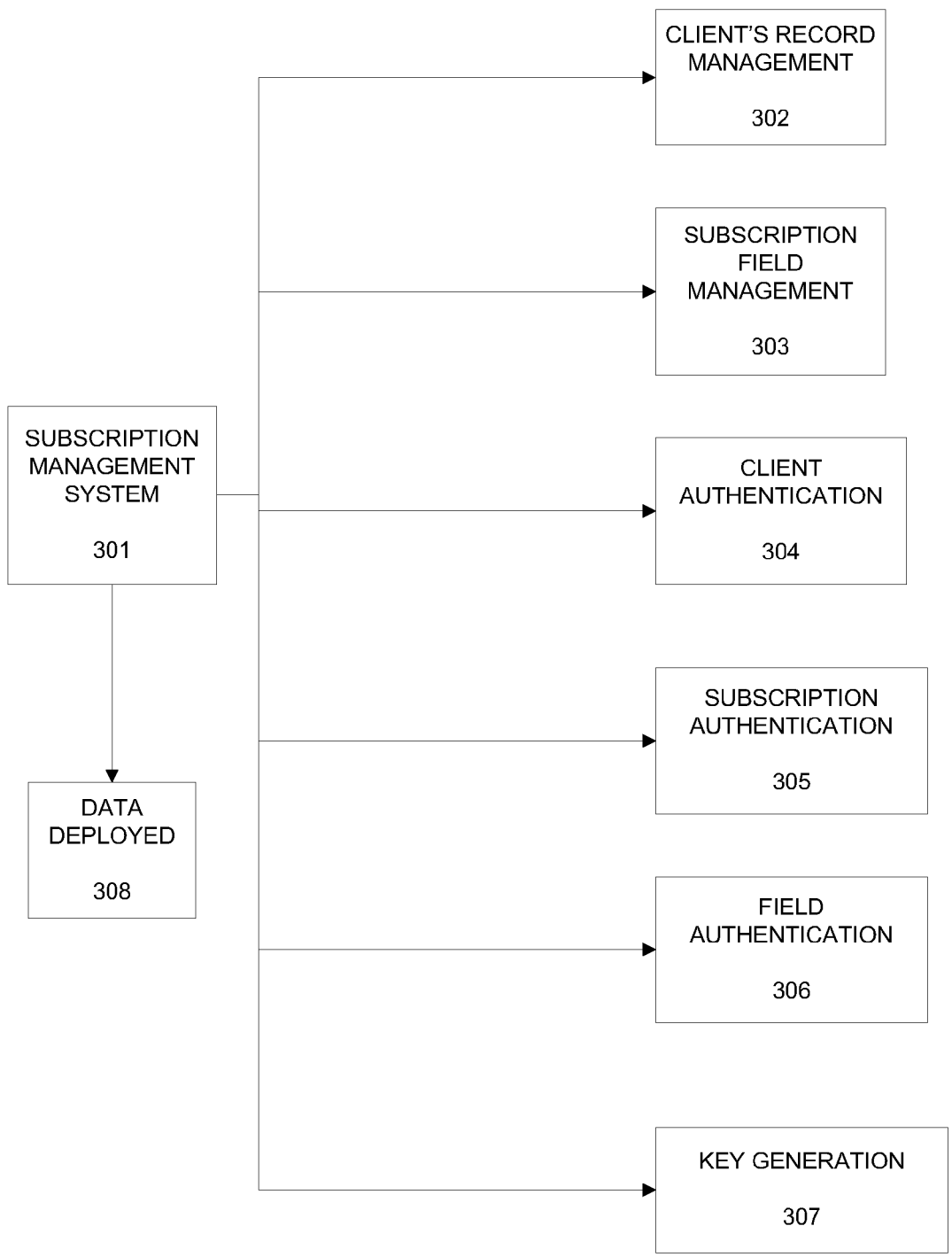
FIG. 3 depicts a technical flow diagram of an exemplary Customer Management/Holding CRM control panel.

Once the Apparatus is installed 203 on the Client CRM 204, the Host must use Apparatus 203 to the Client CRM FIG. 3 is an exemplary technical flow diagram of an exemplary Subscription Management System located within the Customer Management/Holding CRM control panel referenced in FIG. 2. Once the apparatus is installed on the Client CRM, the user may first fill out a form requesting access to the CRM. This form creates a User record within the holding CRM. The User Authentication Check 301 is carried in the Subscription Management System 301. This system has a list of Client users that are subscribed to receive access 302. The permissions are entered in manually via the control panel and include duration of permission, segment of the database that is authorized, and any other necessary constraints.

The Subscription Management System also may determine which fields within the Records need to be synced 303. Each time the Client user accesses the Holding CRM, the apparatus authenticates the Client 304, verifies that the Client's subscription is valid 305, and verifies which fields will be accessed 306. Then an API key 308 is generated so that the Holding CRM can send the authorized data to the Client CRM.

In a further embodiment, the Apparatus may be used in reverse. For example, the Client CRM may send information to a Host CRM with records or specific fields within those records. The reverse would be useful if the Host has appointed numerous, independent Clients. In this manner, the Host can keep track of a process on a global scale without compromising the integrity or privacy of the Client database. The Client agrees to use the same CRM system or CRM system that is compliant with the Host. The Host and Client may agree on which records to collaborate. The Client may then share the records by, for example, ticking a box (or using the same identifier).

As will be understood by those skilled in the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure herein is intended to be illustrative, but not limiting, of the scope of the invention.

I claim:

1. A method comprising:
    based on data specific to a client, and stored in a host database, identifying with a processing system associated with said host database and comprising one or more processors one or more fields of a record to be updated in a client database managed by said client and to which said client has read and write access, wherein host CRM (Client Relationship Management Software) and the Client CRM linked via a holding CRM where data is stored and downloaded and permissions regarding what data the Client has access to and for how long this access is allowed is held wherein any changes made to said record in said client database are noted in a field of a note section of said record with time stamp to reconcile client data with host data, wherein, for said processing system, read access is not provided to any fields of said record in said client database, wherein, for said processing system, write access is provided only to a subset of the fields of said record in said client database, and for at least one field in said record in said client database neither read nor write access is provided, and wherein said subset of the fields of said record to which write access is provided includes said identified one or more fields to be updated; and updating, based on said data stored in said host database, one or more fields of said identified one or more fields of said record in said client database, wherein the updating is performed by copying deleted information, creating missing or new information and making invisible out of scope information, wherein said updating is performed only in response to a request from said client, and wherein said write-only access to said client database is obtained via a plug-in to software managing said client database.

2. A method as in claim 1, wherein a database management system managing said host database is not given read access to any records in said client database.

3. A method as in claim 1, wherein said identifying comprises identifying a name in a field or a combination of fields.

4. A method as in claim 1, further comprising adding one or more new records to said client database.

5. A method as in claim 1, wherein said obtaining step is performed via a filter.

6. A method as in claim 1, wherein said updating is performed according to a schedule.

7. An apparatus comprising a non-transitory computer readable medium storing software operable to perform the steps of claim 1.

8. A method as in claim 1, wherein changes made to said record in said client database are noted in a field of said record.

9. A method as in claim 1, wherein said request from said client is made manually.

10. A method as in claim 1, wherein said request from said client is made automatically according to a schedule.

11. A method as in claim 1, wherein identifying one or more fields of a record to be updated in said client database is based on a unique ID that matches the record in the client database with a record in the host database.

12. A system comprising:
a host database storing data specific to a client;
a processor in communication with said host database that, based on data specific to a client, and stored in the host database, identifies one or more fields of a record to be updated in a client database managed by said client and to which said client has both read and write access, wherein said host CRM (Client Relationship Management Software) and the Client CRM linked via a holding CRM where data is stored and downloaded and permissions regarding what data the Client has access to and for how long this access is allowed is held wherein any changes made to said record in said client database are noted in a field of a note section of said record with time stamp to reconcile client data with host data, wherein, for said processing system, read access is not provided to any fields of said record in said client database, wherein, for said processing system, write access is provided only to a subset of the fields of said record in said client database, and for at least one field in said record in said client database neither read nor write access is provided, and wherein said subset of the fields of said record in said client database to which write access is provided includes said identified one or more fields to be updated; and a processor in communication with said client database that updates, based on said data stored in said host database, one or more fields of said identified one or more fields of said record in said client database, wherein the updating is performed by copying deleted information, creating missing or new information and making invisible out of scope information, wherein said updating is performed only in response to a request from said client, and wherein said write-only access to said client database is obtained via a plug-in to software managing said client database.

13. A system as in claim 12, wherein a database management system managing said host database is not given read access to any records in said client database.

14. A system as in claim 12, wherein said identifying comprises identifying a name in a field or a combination of fields.

15. A system as in claim 12, further comprising a processor that adds one or more new records to said client database.

16. A system as in claim 12, wherein said obtaining is performed via a filter.

17. A system as in claim 12, wherein said updating is performed according to a schedule.

18. A method as in claim 12, wherein the processor identifies one or more fields of a record to be updated in said client database is based on a unique ID that matches the record in the client database with a record in the host database.

* * * * *